United States Patent [19]

Konstanzer

[11] Patent Number: 5,450,001
[45] Date of Patent: Sep. 12, 1995

[54] PROCESS AND DEVICE FOR SAFEGUARDING AN ALTERNATING CURRENT CIRCUIT HAVING AN ELECRTRICAL LOAD ASSOCIATED THEREWITH

[75] Inventor: Michael Konstanzer, Freiburg, Germany

[73] Assignee: Patentstell fuer die Deutsche Forschung der Fraunhofer-Gesellschaft e.V., Munich, Germany

[21] Appl. No.: 950,852

[22] Filed: Sep. 28, 1992

[30] Foreign Application Priority Data

Sep. 27, 1991 [DE] Germany ............ 41 32 208.8

[51] Int. Cl.⁶ .................................. G05F 1/10
[52] U.S. Cl. ..................... 323/238; 323/209; 323/212; 323/235; 323/325
[58] Field of Search ............ 323/237, 238, 300, 320, 323/325, 209, 210, 211, 212, 235, 319; 307/127, 132 E

[56] References Cited

U.S. PATENT DOCUMENTS

| | | | |
|---|---|---|---|
| 4,131,847 | 12/1978 | Kohga et al. | 324/141 |
| 4,404,501 | 9/1983 | Krampe et al. | 318/7 |
| 4,847,721 | 7/1989 | Nothofer et al. | 361/23 |
| 4,868,486 | 9/1989 | Shinoda | 323/324 |
| 5,148,097 | 9/1992 | Draxelmayr | 323/237 |

FOREIGN PATENT DOCUMENTS

4011170 10/1990 Germany .

*Primary Examiner*—A. D. Pellinen
*Assistant Examiner*—Y. Jessica Han
*Attorney, Agent, or Firm*—Evenson, McKeown, Edwards & Lenahan

[57] ABSTRACT

A device runs a precheck of an inductive load for an overload prior to switching on to supply mains. For this purpose, following switching-on for a load precheck, initially a phase limited voltage signal is applied to the load, whereby the voltage signal duration gradually increases. With the start of each application of voltage, the active current is measured in a narrow time window. If it does not exceed a predetermined active current limit at an application of a specific effective voltage, the load is switched to the mains. Otherwise, the switch-on process is cut off. This switching-on process avoids a high taxing of the mains in the event of a short circuit or an overload. The active current window begins with the application of voltage to the load. At a different time than this time window, a further measurement window is provided for the reactive current, whereby this measurement window begins with the zero crossing of the alternating voltage. The measurement of the reactive current serves to determine a defined state of magnetization of an inductive load in order then to be able to switch the load to the mains in phase and without any switch-on current surge.

11 Claims, 10 Drawing Sheets

PROCESS AND DEVICE FOR SAFEGUARDING AN ALTERNATING CURRENT CIRCUIT HAVING AN ELECRTRICAL LOAD ASSOCIATED THEREWITH

BACKGROUND AND SUMMARY OF THE INVENTION

The present invention relates to a method and an apparatus for safeguarding an a.c. circuit, wherein the effective voltage applied to the load circuit is gradually raised, in particular, by enlarging the angle of the current flow, and wherein the load circuit is cut off when a predetermined load current is exceeded.

A process for reducing the surge of switch-on current when operating an inductive load, wherein the effective voltage at the load is increased by enlarging the phase operating angles of the voltage halfwave while measuring the current, is known in German Patent document DE A1 40 11 170. If a specific current threshold value is exceeded in the process, it is assumed that magnetization of the inductive load is at the end of the hysteresis curve. From this point on, switch-on occurs with a counterpoled voltage of a larger effective value.

When measuring the current during switch-on, it has always been assumed that when the current threshold value is exceeded, magnetization is at saturation, i.e. at the end of the hysteresis curve. However, no differentiation is made between active current and reactive current, so that it is not possible to determine if there is an overload or a short circuit in the a.c. circuit. An overload or short circuit causes a gradual increase in the current flow which exceeds the current threshold value and causes a switch-on. This subsequently results in tripping a safeguard element.

SUMMARY OF THE INVENTION

An object of the present invention is to provide a method and apparatus which switches on a load having an inductance without undesirable high switch-on currents (inrush) which is also able to differentiate between the occurrence of an overload current and a current resulting from magnetic saturation of an inductive load, and which responds appropriately to an overload current. The mains load in general should be kept as low as possible when switching on even in the event of a short circuit.

According to the present invention, a phase limited voltage signal is applied to an a.c. circuit load and the active current is measured to detect an overload or short circuit in the load prior to connecting the circuit fully to voltage mains. The time window (duration) of the phase limited voltage signal is increased for each subsequent cycle. Measuring the active current occurring at a specific time, notably immediately following switching-on, allows determination of whether there is an overload or a short circuit in the load circuit when the active current measured within the time window rises disproportionately to the gradual increase in the phase limited voltage signal.

The predetermined active current limit and the threshold for determining an overload are substantially above the expected amount of active current occurring during normal operation. The process for safeguarding an a.c. circuit can be utilized irrespective of whether the load is ohmic, inductive, or both.

If there is an inductive load with a magnetizable core in the load circuit, in accordance with an exemplary embodiment of the present invention, it is provided that, in addition to the active current, the reactive current is measured in the region of the zero crossing of the a.c. voltage and that, in order to reduce the switch-on current surge, upon occurrence of the reactive current exceeding a predetermined limit, a voltage is applied to the circuit having a polarity opposite to and a magnitude greater than the voltage causing the reactive current to exceed the limit.

By this further development of the present invention, in addition to permitting a load precheck of active current for overloads or short circuits, switching-on the load can be performed with minimal switch-on reactive current surge because of temporally separate measurement of the active current and the phase-shifted reactive current, whereby following the occurrence of a specific reactive current limit, the inductive load can be switched on according to the magnetization of the load. By means of this "synchronization," high reactive currents (inrush) are avoided when switching-on.

For the prior art, which provided for the gradual increase of the voltage while checking a current limit, it was assumed that the appropriate moment had arrived to connect the load fully to the mains when the limit was exceeded. This current, however, could also be a result of an overload in the load circuit so that upon full switch-on, safeguard elements are tripped and high current peaks occur. By selectively measuring the active and reactive current, this condition is avoided as full switch-on of the mains only occurs when the active current measurement first indicates there is no overload.

According further to the present invention, a device for safeguarding an a.c. circuit is provided with an a.c. switch connected to a phase trigger and a process control for increasing the effective voltage at the load to be switched on. An element of an exemplary embodiment of the present invention is that this device has a current measurement unit in the load circuit, a gating unit working in conjunction with a time delay element for gating the current at the start of the application of voltage to the load over a predetermined period of time in order to selectively determine the peak value of the active current.

The measurement of current with each application of a phase limited voltage to the load occurs within a time window in which an active current may occur. This time window begins with the application of voltage and ends at a time prior to the succeeding voltage zero crossing in order to avoid influence from the reactive current. The measurement time window is designed as small as possible and is only long enough so that reliable measurement of the active current is possible.

A further exemplary embodiment of the present invention provides that, in addition to the active current measurement unit, there are a reactive current measurement unit with a time delay element that is triggered by the phase trigger and a second gating unit triggered thereby for gating the current at the start of a voltage zero crossing for a predetermined period of time. With this additional measurement unit, the occurring reactive current can be measured separately from the active current as the measuring window provided therefor does not start until the zero crossing of the a.c. voltage. The measurement of the reactive current is utilized for inrush-free switching-on of the load.

Other objects, advantages and novel features of the present invention will become apparent from the following detailed description of the invention when considered in conjunction with the accompanying drawings.

DETAILED DESCRIPTION OF THE DRAWINGS

Figure 1:
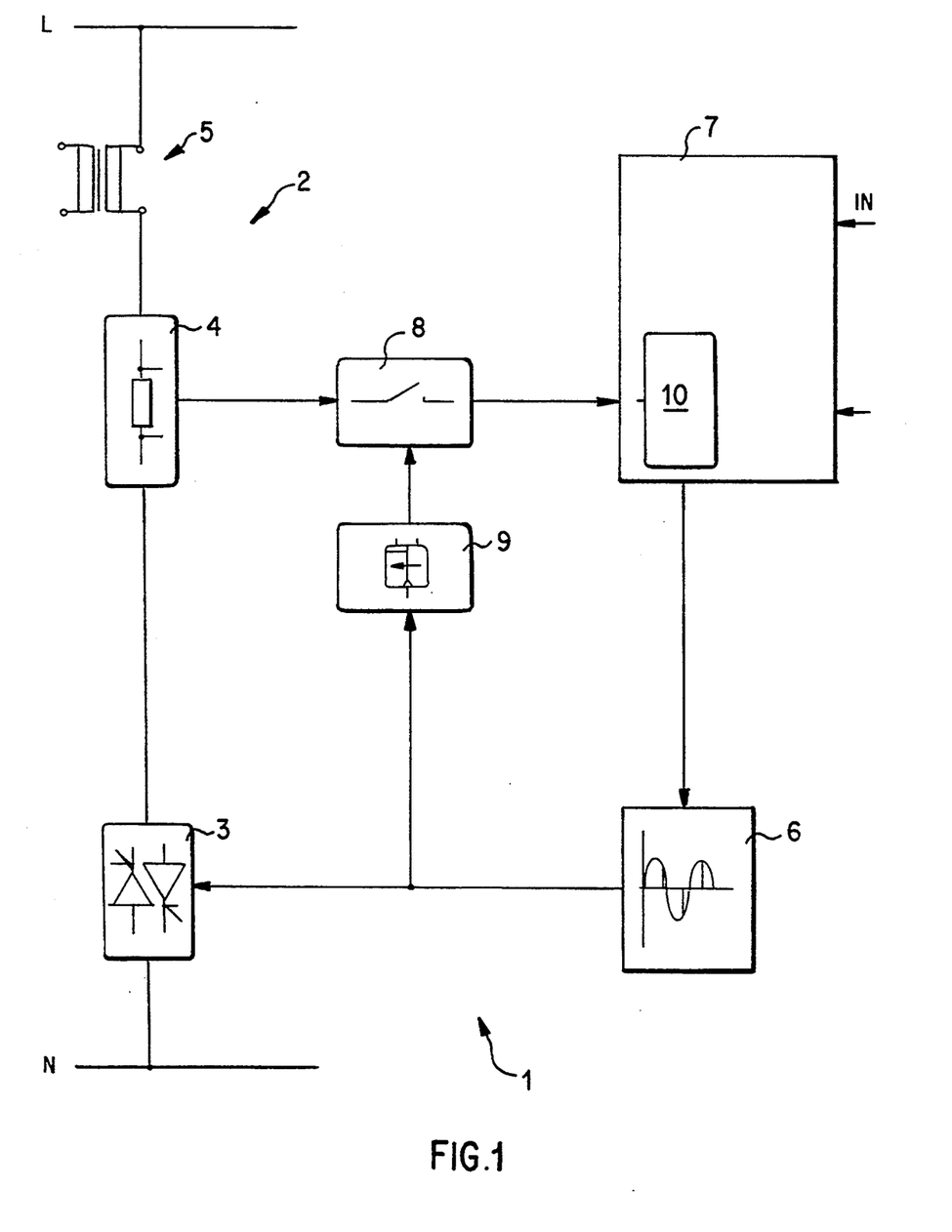
FIG. 1 is a block diagram showing an active current measurement unit for safeguarding an a.c. circuit according to an exemplary embodiment of the present invention.

A device 1 shown in FIG. 1 safeguards an a.c. circuit 2 having connected in series an electronic a.c. switch 3, a current measurement device 4, and a load 5. The load 5 is a transformer and thus is inductive and has a magnetizable core. With the aid of the device 1, an a.c. circuit connected to lines L and N can be protected prior to switching on the load 5 fully to determine whether there is an overload, such as a short circuit, by measuring the active current. Active current is current that is in phase with an a.c. voltage signal while reactive current is current that is 90° out of phase with an a.c. voltage signal. The measurement of the active current occurs during application of phase limited voltage halfwaves so that the effective value of the voltage signal is relatively small. If a predetermined active current limit is exceeded during the active current check using the limited effective voltage, switch-on is broken off.

In a preferred embodiment, the electronic a.c. switch 3 comprises two antiparallel connected thyristors or, alternatively, a triac which is triggered by a phase trigger 6. The device 1 also comprises a process control 7, a gating unit 8, and a time delay element 9. The process control 7 is a conventional microprocessor system, such as an IBM PC, with A/D converters, such as IBM PC plug-in cards, for converting the analog current value to a digital signal in a manner known to one skilled in the art.

Following switching-on by an external switch-on command at the process control 7, starting impulses are transmitted to the phase trigger 6 to the a.c. switch 3, beginning initially with a large phase angle, that is with a small current flow angle. The time delay element 9, which is also triggered with each starting impulse, activates the gating unit 8 for a specific amount of time.

The gating unit 8 is located between the current measurement unit 4 and the process control 7. The process control contains an active current measurement unit 10 which can be implemented, for example, using circuitry on the above mentioned IBM PC plug-in card. The time delay element 9 is set in such a manner that the measurement of active current, starting with the starting impulse, occurs for only as long as needed for a reliable measurement. Simultaneous to the start of the voltage application, a reactive current also begins to build up which would alter the result of the active current measurement if the active current time window were too wide. Measurement times of less than 0.2 milliseconds appear to be favorable.

The active current measurement unit 10 checks whether or not the measured active current exceeds a predetermined active current limit. If the limit is not exceeded, this indicates that there is no overload in the a.c. circuit 2 so that voltage can be applied fully via the switch element 3. If, however, the predetermined active current limit is exceeded, switch-on is broken off. Checking the load circuit for overloading can, if need be, occur during a period of alternating voltage or can occur during half an alternating voltage period.

Figure 3:
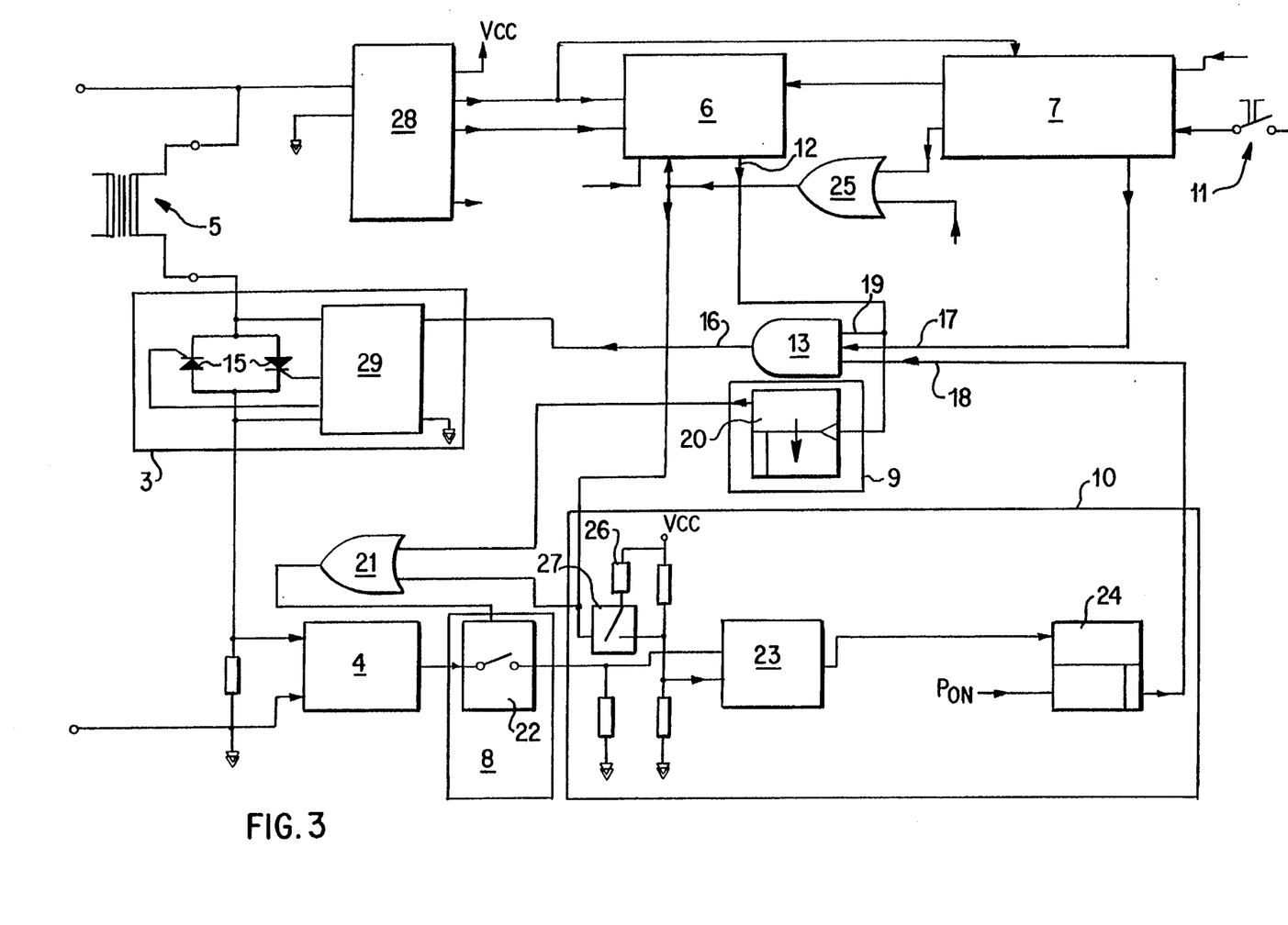
FIG. 3 shows a detailed block diagram representation substantially corresponding to FIG. 1.

FIG. 3 depicts in more detail the block diagram shown in FIG. 1. If an ON signal is transmitted to the process control 7 via a switch 11, the process control 7 transmits a control voltage to the phase trigger 6 which generates starting impulses at an output 12. The starting impulses are provided to the thyristors 15 in the a.c. switch 3 via an AND-gate 13 and a starter 29. The starting impulses are measured in such a manner that gradually increasing small phase angle halfwave lobes are generated. Initially, current is supplied with a very small current flow angle which is gradually enlarged. In order that the starting impulses from the phase trigger 6 reach an output 16 of the AND-gate 13, clearance signals are provided to both inputs 17, 18 of the AND-gate with input 17 being connected to the process control and input 18 connected to the active current measurement unit 10.

In addition to being provided to the input 19 of the AND-gate 13, the starting impulses from the phase trigger 6 are also provided to the input of a mono-flop 20 which comprises the time delay element 9 of in FIG. 1. The measurement time for the active current is determined by the mono-flop 20. The time may be, for example, 0.2 milliseconds. The mono-flop 20 is set with each starting impulse and its output signal reaches, via an OR-gate 21, the gating unit 8 which comprises an electronic switch 22. The gating unit 8 is located between the current measurement unit 4 and the active current measurement unit 10.

The active current time window is initiated by the starting impulses and has a length which is determined by the mono-flop 20. During the active current time window, the electronic switch 22 is closed and transmits the current value measured in the load circuit from the current measurement unit 4 to the active current measurement unit 10. The active current measurement unit 10 contains a comparator 23 and a flip-flop 24. In the comparator 23, the measured current value is compared with a preset active current value limit. If the measured current value lies below the limit, the clearance signal is maintained at the output of the flip-flop 24. However, if the active current limit is exceeded, the flip-flop 24 is set by the comparator 23 so that there no longer is a clearance signal of the current evaluation unit 10 at the output. When this occurs, the AND-gate 13 blocks the starting impulses and the switching-on process is broken off, because the active current limit has been exceeded. If the load precheck reveals no overload in the load current circuit, the process control 7 switches on permanently after a predetermined amount of time. This control signal is provided to the phase trigger 6 from the process control 7 via an OR-gate 25.

During the load precheck, the comparator 23 may be set at an active current limit which is greater than the peak value of the nominal current at full voltage application. The device may then also serve as a "quick" safeguard during fully switch-on operation. For this purpose, the control signal "fully on" coming from the OR-gate 25 is provided, via the OR-gate 21, to the electronic switch 22 of the gating unit 8. Thus, during operation, there is continuously a measurement of the current, whereby, as in the case of the load precheck, there is a blockage of starting impulses at the AND-gate 13 if during operation an overcurrent occurs which exceeds the release threshold.

In order to be able to precheck the load with a current that is as low as possible prior to permanent switching-on, the active current limit may be smaller than the nominal current peak value occurring during full operation. In this event, however, the phase angle of the voltage halfwaves provided for the load precheck must be greater than 90° so that a current flow angle of less than 90° is present, whereby the release threshold can be reduced for the active current limit with an increasing, maximally permissible starting angle.

In order to then avoid tripping the "quick" safeguard following full (permanent) switching-on, the response threshold of the active current limit is set relatively high at the comparator 23 after permanent switching-on. In a preferred embodiment, a switchable resistance 26, which can be selected via an electronic switch 27, is provided at the phase limit voltage divider of the comparator 23. This electronic switch 27 is connected to the output of the OR-gate 25 so that it switches through with the "fully on" signal and the response threshold of the comparator is thereby raised. By this means it is possible to work with very low check currents during the load precheck and the supply a.c. mains are not seriously loaded even when switching on an overload or in the case of a short circuit. This is of particular significance in the case of weak mains or island mains.

FIG. 3 shows another power supply unit 28 for the current supply of the electronic module units. Also shown in the function block illustrating the a.c. switch 3 is a starter 29 for separate triggering of the thyristors 15.

During normal operation, the device 1 provides a quick safeguard which responds quickly to exceeding a predetermined active current limit. The limit resulting in tripping the quick safeguard may be a multiple of the nominal current in order to avoid tripping the safeguard when very brief, high current peaks occur.

Figure 4:
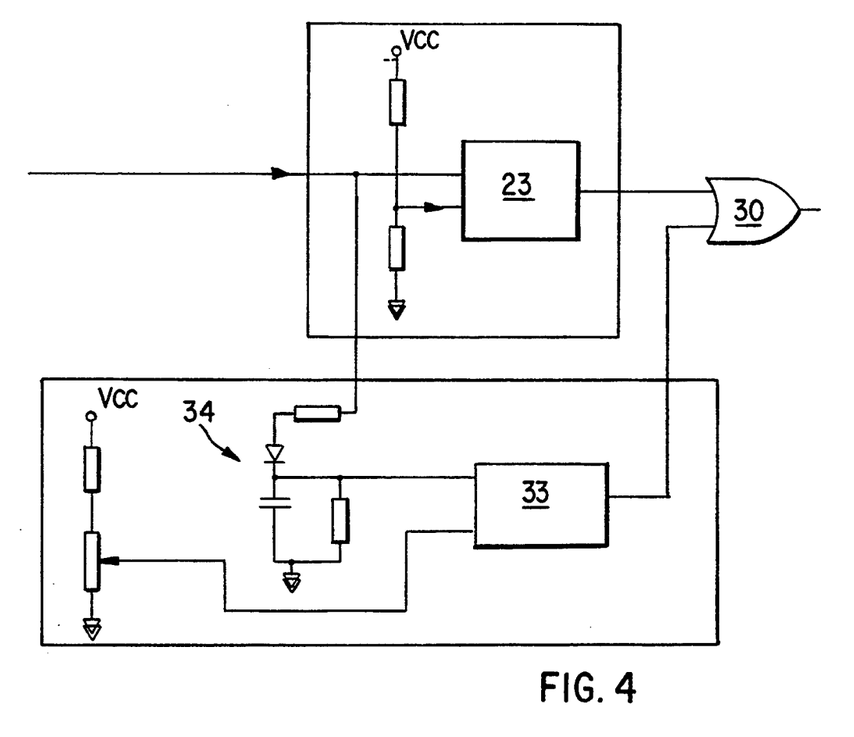
FIG. 4 shows an expansion of a circuit according to an exemplary embodiment of the present invention with an additional function block for a slow safeguard.

FIG. 4 depicts a circuit providing a combination of a quick safeguard and a slow safeguard, suitable for use in the device of FIG. 3. In this arrangement, the two branches of the safeguard are connected in parallel and their outputs are led to an OR-gate 30. The output of the OR-gate 30 can be connected to the flip-flop 24 illustrated in FIG. 3. The slow safeguard 31, like the quick safeguard 32, is provided with a comparator 33 having an input for a current limit and an input for the actual current value. Switched to the actual current input is a delay circuit 34 comprising two resistances, a diode and a capacitor. In this way the actual current value reaching the actual current input of the comparator 33 is delayed. The response threshold for the quick safeguard 32 is higher than that of the slow safeguard 31 whereby the current response threshold of the quick safeguard may correspond to about ten times the nominal current and the response threshold of the slow safeguard to about two times the nominal current.

Figure 2:
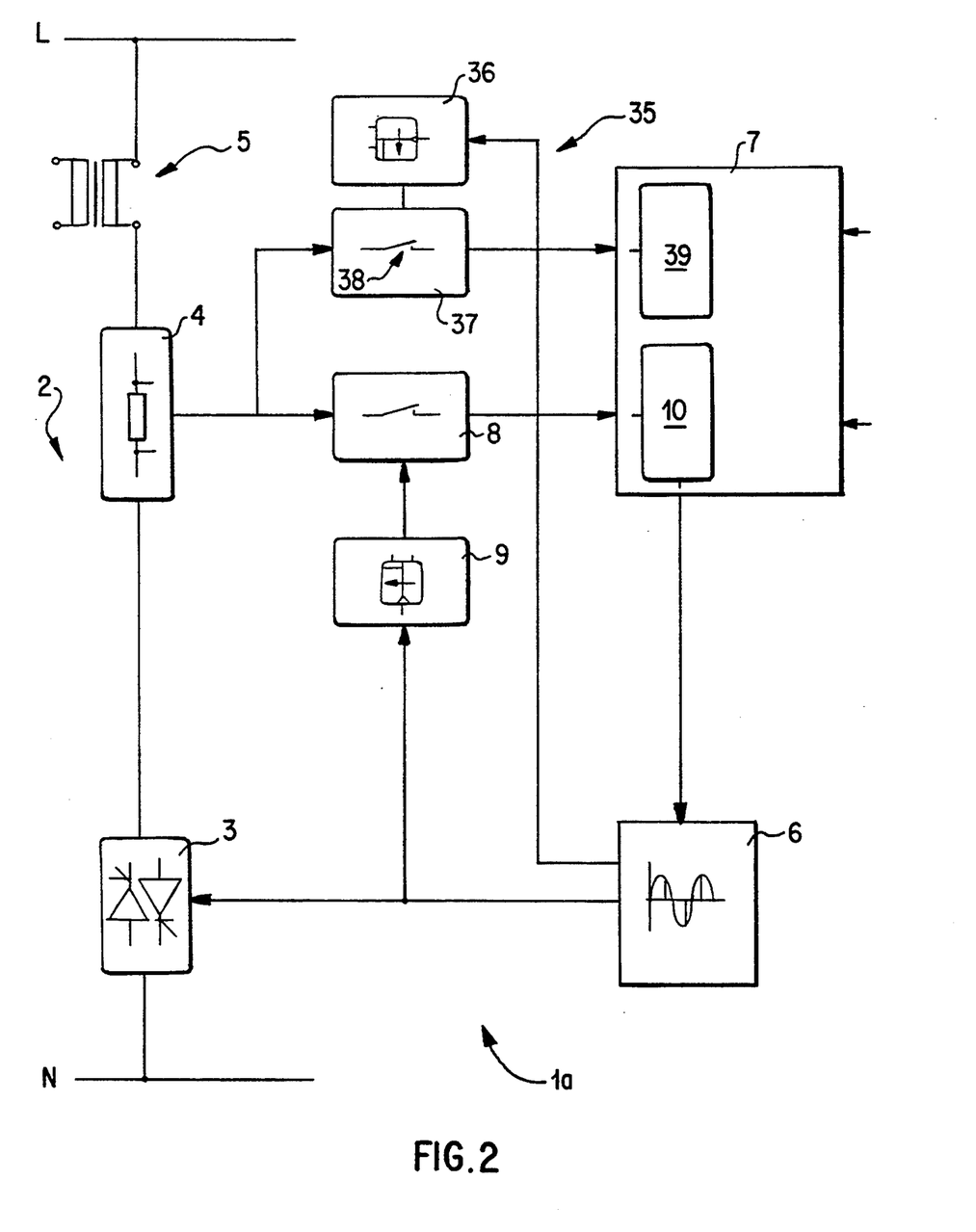
FIG. 2 shows a block diagram similar to FIG. 1 with an additional reactive current measurement unit according to an exemplary embodiment of the present invention.

FIG. 2 depicts a block diagram of a protective device 1a similar to that of FIG. 1 with the addition of a reactive current measurement unit 35, which permits measuring active and reactive current separately. The reactive current measurement unit 35 has a time element 36 which is triggered by the phase trigger 6 and which is connected to a gating unit 37 in the form of an electronically triggered switch 38. The gating unit 37, like the gating unit 8, is connected to the current measurement unit 4. The output of the gating unit 37 is connected to a reactive current measurement unit 39 which is located within the process control 7.

A time delay element 36 is activated with each zero crossing of the voltage, for example with a positive increase, and activates the gating unit 37. The measuring time may, for example, be 0.2 milliseconds. As measurement occurs following the zero voltage crossing, the reactive current is measured in the measurement window.

If there is an inductive load provided with a magnetizable core in the load circuit 5, measurement of the reactive current permits bringing the magnetization of this load into a defined state. Moreover, based on this defined magnetization state, the inductive load can be connected to the mains without a substantial switch-on current surge. The reactive current increases in proportion to the increasing effective phase angle of the voltage halfwaves. When magnetization saturation of the inductive load is reached, the reactive current increases sharply. Reaching the reactive current threshold can be determined by the reactive current measurement unit 35. When a predetermined reactive current limit is exceeded, switching-on can occur with an a.c. voltage having a greater value, such as the full mains voltage, without the occurrence of a high switch-on surge of current.

Due to the ability to separately measure the active current and the reactive current, a device 1a can check the load 5 during the switching-on process for an overload or a short circuit and simultaneously, if there is no overload, switch-on the load 5 without a great switch-on surge of current. By means of the separate measurement of the active current and the reactive current, no switch-on takes place when there is an overload.

Figure 5:
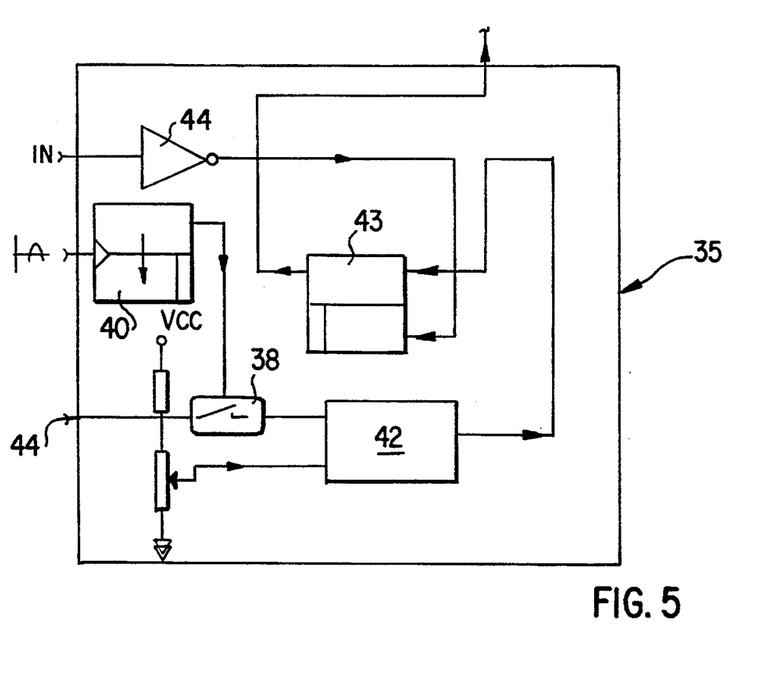
FIG. 5 shows a block diagram of a reactive current measurement unit according to an exemplary embodiment of the present invention.

FIG. 5 depicts the reactive current measurement unit 35 in a more detailed manner. It has a mono-flop 40 which acts as a time delay element 36. Coupled to the input of the mono-flop 40, in the preferred embodiment, are the positive voltage halfwaves. The mono-flop 40 sends to the electronic switch 38, which forms the gating unit 37 of FIG. 2, a control signal indicating the zero crossing of the positive voltage halfwave so that the actual current value at the input 41 is coupled to the actual value input of a comparator 42. The second input of the comparator 42 is provided with a reference voltage from a voltage divider for defining the reactive current limit. If the reactive current limit is exceeded, a control signal from the comparator 42 is provided to a flip-flop 43 which provides a corresponding output signal to the OR-gate 25 illustrated in FIG. 3. The control signal causes a full switch-on of the load 5 to the mains. An inverter 44 sets the flop-flop 43 in a reset state prior to switching-on.

Figure 6:
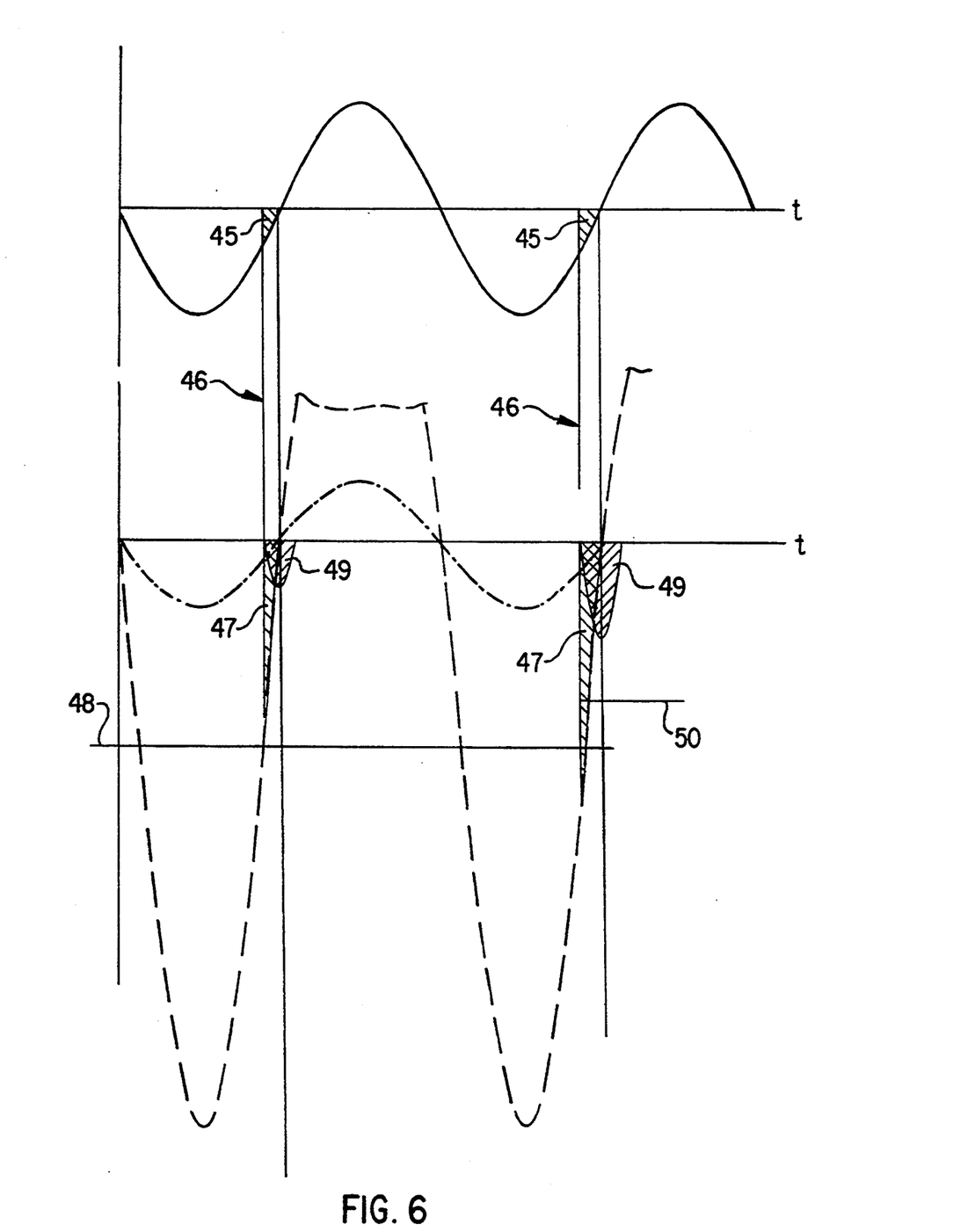
FIG. 6 shows a diagram with a representation of the voltage and the currents occurring within a load current circuit.
Figure 7A:
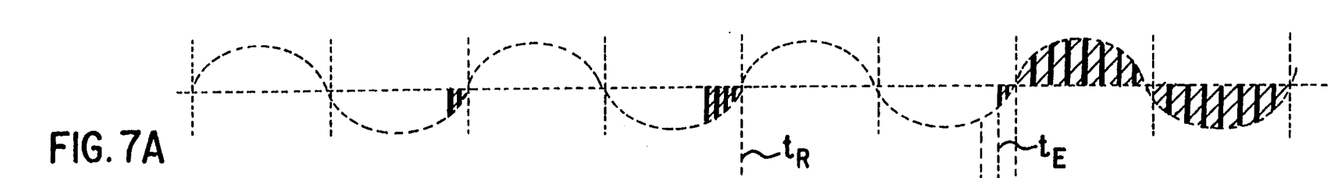
FIG. 7 shows several diagrams with signal paths at the temporally defined switch-on of a relay belonging to a switch element according to an exemplary embodiment of the present invention.
Figure 7B:
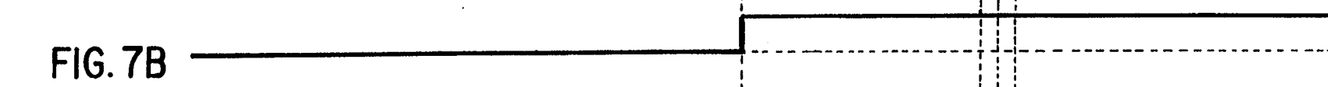
Figure 7C:
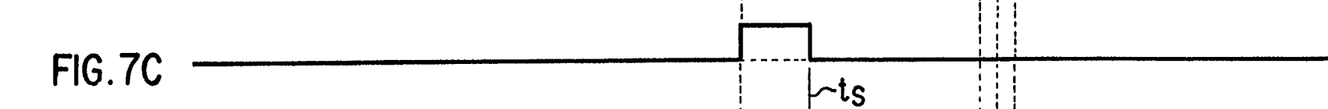
Figure 7D:
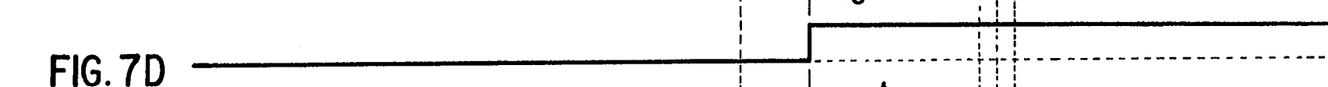
Figures 7E, 7F:
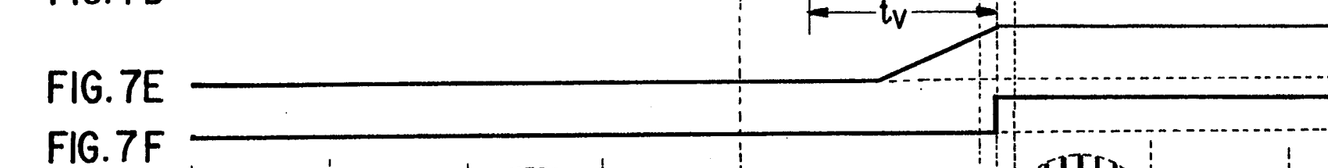
Figure 7G:
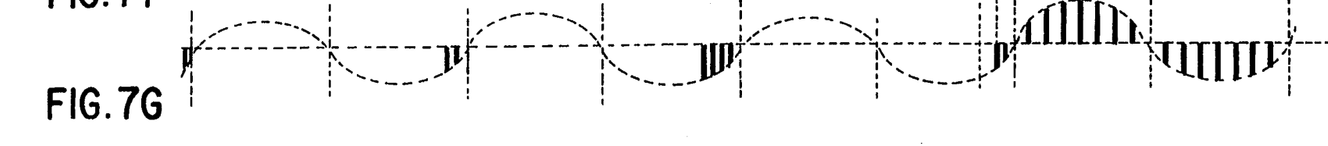

FIG. 6 shows, in the top line of the diagram, a voltage curve and, in the bottom line, the current curves at a secondary of a short-circuited transformer representing the load 5. In this embodiment, negative voltage halfwaves having only small voltage phase angles 45, which enlarge with time, are gated through to the load 5.

At the starting point 46, when the respective voltage phase angles 45 begin, an active current 47, which can be seen in the lower line of the diagram, starts flowing. The amount of active current depends upon the effective value of the respective voltage phase angle 45 and the load 5. The active current amplitudes increase in proportion to the voltage phase angles 45. In the lower current curve diagram there is a release threshold for a predetermined active current limit 48 drawn parallel to the time axis. It can be seen that this release threshold is not reached with the first active current impulse 47. This release threshold is reached by the second active current impulse. As described with FIGS. 1 and 3, the switch-on process is then broken off if the predetermined active current limit 48 is exceeded.

In the current curve diagram, the plot of the current which would flow upon direct switching-on of the secondary short-circuited transformer at a load to the mains is drawn with dashes. In comparison to the limit-exceeding active current occurring in the second negative halfwave, it can be seen that, by means of the invented process, only small effective currents can flow even in the case of short-circuited loads. For clarity, the plot of the current setting in at nominal load is drawn with dashes and dots.

For this example, the transformer provided is an inductive load and from the starting point 46 on, a reactive current 49 builds up to a maximum which occurs during the voltage zero crossing. Due to the temporal, sequential arrangement of the measurement time windows for the active current and for the reactive current, both these currents can be measured selectively and separately. The time window for measuring the active current begins at the starting point 46 and is as short as possible. For example, 0.2 milliseconds or less can suffice for a reliable measurement. The time window for measuring the reactive current begins with the zero voltage crossing and is also long enough for a reliable measurement to be carried out. In this case too, for example, 0.2 milliseconds or less suffices. By means of these relatively narrow time windows, the interactive influencing of the measurement values is prevented, because the time between the two windows is relatively large.

The separate measurement of the reactive current from the active current is utilized for a "gentle" switch-on process. Because the magnetization or remanence state prior to switching-on the inductive load is unknown, a great surge of switch-on reactive current could set in if the mains are directly switched-on, which could result in tripping a fuse or the like. In order to avoid this, the inductive load is brought on by means of a small, gradually increasing effective voltage phase angles 45. The current therefrom results in a defined magnetization starting state. Attainment of this state is indicated by a strongly increasing reactive current. This can be determined with the aid of the circuit according to FIG. 2 and FIG. 5.

In FIG. 6, the response threshold provided for the reactive current limit 50 is shown in the lower diagram of current curves. In this diagram, the reactive current limit 50 is not attained because in this example the switch-on process is broken off due to the active current limit being exceeded (assumed case of a secondary-sided short circuit in the transformer). If this were not the case, the reactive current in one of the succeeding negative halfwaves would have exceeded the predetermined reactive current limit 50 which would have caused an in phase switching-on of the load to the mains voltage.

Figure 8:
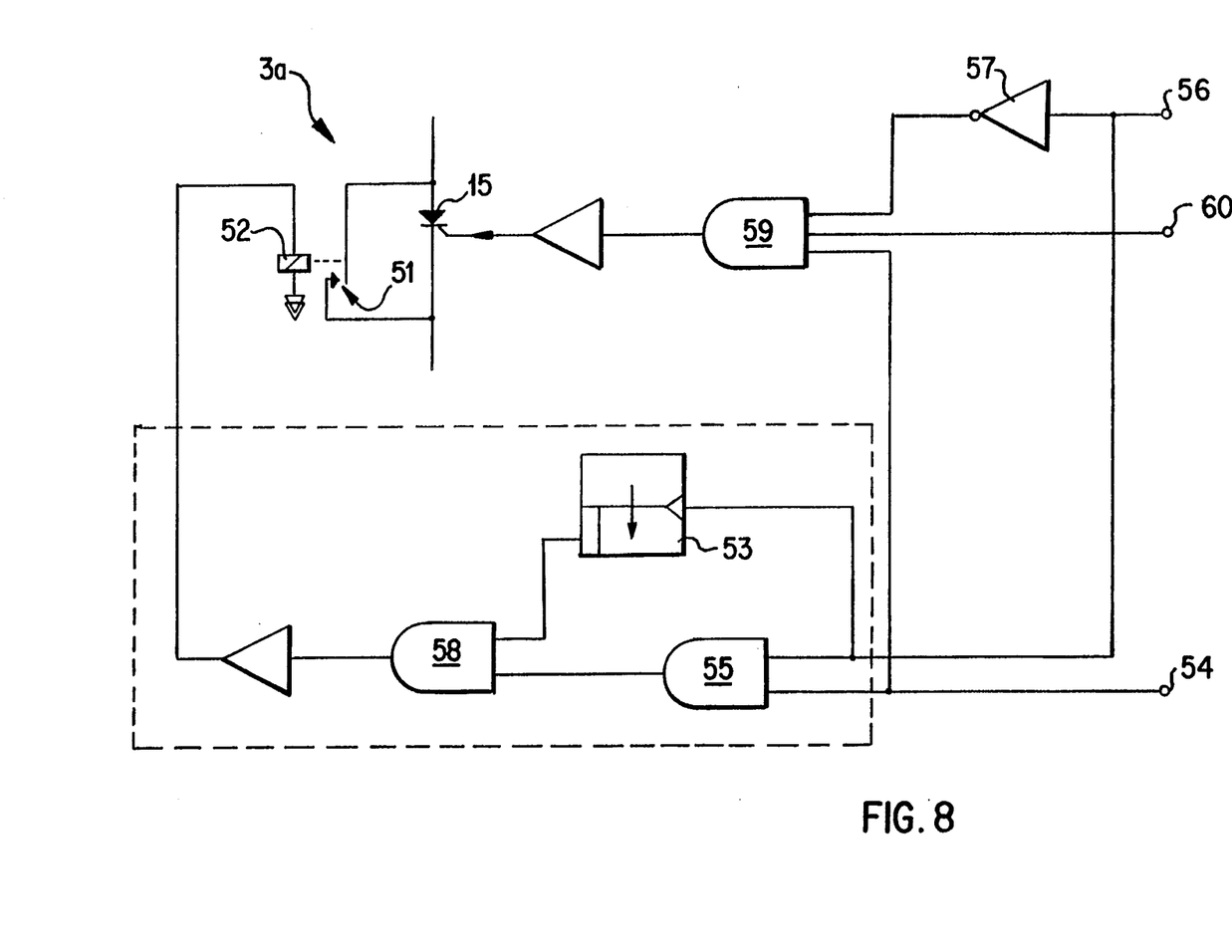
FIG. 8 shows the switch element having an electromechanical switch and a thyristor as well as the respective triggering means according to an exemplary embodiment of the present invention.
Figure 9:
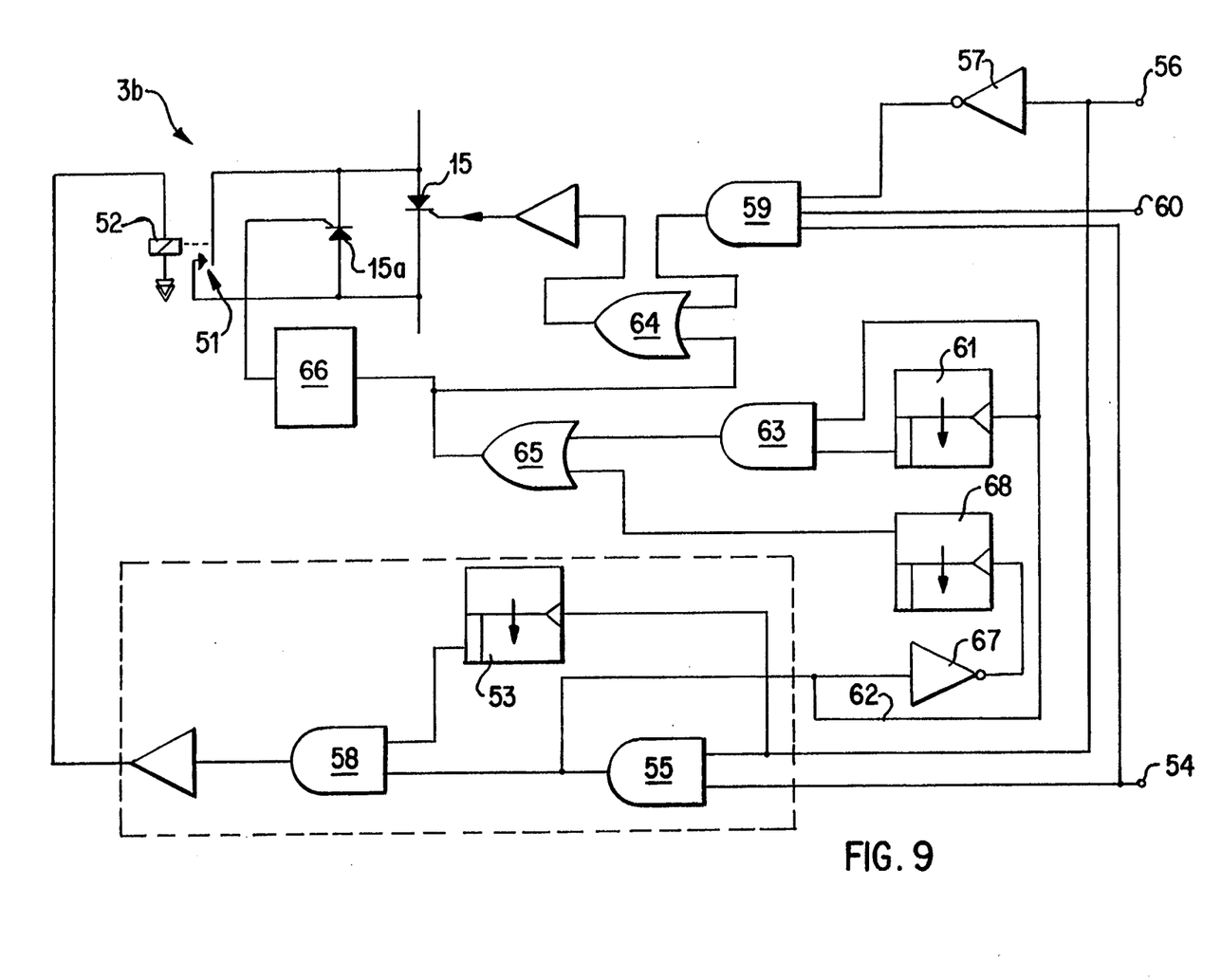
FIG. 9 shows a switch element with two antiparallel connected thyristors and an electromechanical switch as well as a triggering means according to an exemplary embodiment of the present invention.

FIGS. 7 to 9 show further measures which allow the invented devices 1 and 1a being built as a compact "preliminary switching device". The measure according to FIG. 1 can obviate safeguard elements dimensioned for high overload current and being accordingly quite large. The circuits according to FIG. 2 and FIG. 5 avoid large switch-on peak currents and thereby permit substantially smaller construction of the circuit elements.

In a relatively small circuit construction, heat can develop at the switch element 3. In order to avoid this, the switch element 3a illustrated in FIG. 8 is provided with a parallel connection of a thyristor 15 and a mechanical contact 51 of a relay 52.

The thyristor 15 applies voltage to the load with very small effective voltage phase angles 45 (compare FIG. 6). Accordingly, this thyristor 15 may also be sized for very low currents so that a relatively small construction suffices. The heat development can also be ignored because of the short operation span during the start phase. For subsequent full switch-on, the relay contact 51 is then closed. To provide for this occurring at the prescribed moment and to avoid surges of switch-on current, the switch-in time of the relay contact 51 is determined by factoring in the relay pick-up time delay. In order to hit the exact switch-on moment, a time delay element in the form of a mono-flop 53 is provided whose time delay is set to correspond to the relay starting delay, measured from the signal to the full switch-on.

FIG. 7 shows the manner of operation of the circuit illustrated in FIG. 8. In the first line of the diagram, the main alternating voltage is shown with increasing voltage phase angles 45, cross-hatched here for clarity to indicate connection to the load. The time tE indicates the moment when the load is to be fully connected to the mains. The time tR indicates the moment at which the reactive current measurement device 35, shown in FIG. 5, emits a control signal indicating that a magnetization state of the inductive load has been reached. This signal is provided to an input 56 that is connected to an inverter 57, an AND-gate 55, and the mono-flop 53. The AND-gate 55 is, moreover, connected to an input 54 that is connected to a control signal which indicates that no overload was detected in the load precheck phase.

The output of the AND-gate 55 is connected to another AND-gate 58 having a second input connected to the output of the mono-flop 53. At time tR, the mono-flop 53 begins to run. When a predetermined amount of time has elapsed, the AND-gate 58 switches on causing current to flow to the relay 52. The time this takes, ts, is indicated in the fourth line of the diagram of FIG. 7. Due to the starting delay, line V of the diagram shows the relay anchor path. Actual contact of the relay 52 occurs at the moment when current flows to the relay at tE as shown in line VI of the diagram. The starting time delay tv of the relay 52 in conjunction with the time delay of the mono-flop 53 yields the interval between the times ts and tE. The current flowing through the load 5, such as a transformer, is shown in line VII of the diagram.

The starting impulses for the thyristor 15 arriving at the input 60 are only provided to the inverter 57 and an AND-gate 59 if the voltage phase angles 45 are to be generated.

FIG. 9 shows another embodiment of a switch element 3b in which the two parallel connected thyristors 15, 15a and a contact 51 of relay connected in parallel 52 are provided. Like the thyristor shown in FIG. 8, the thyristor 15 serves to generate phase limited voltage impulses 45 prior to the actual, permanent switch on of the load 5 to the mains. In addition, the relay contact 51 is bridged when closed or opened by the conductive connected thyristors 15, 15a.

The function block outlined with dashes in FIG. 8 is also present in the embodiment of FIG. 9. Moreover, the inverter 57 and the AND-gate 59 are also present. In order to switch on the load 5 connected in series with the switch element 3b, a mono-flop 61 is triggered simultaneously with the mono-flop 53 in response to a signal on a pilot line 62 coupled to the output of the AND-gate 55. The time delay of the mono-flop 61 is set in such a manner that it is somewhat shorter than the sum of the time delays of the mono-flop 53 and the relay starting time delay. With the termination of the time delay of the mono-flop 61, both the thyristors 15, 15a are started. This occurs via the AND-gate 63 and the two OR-gates 64, 65. For voltage separation, an optocoupler can also be connected in the trigger line of the thyristor 15a.

When the load 5 is switched off, a mono-flop 68, having a time of operation somewhat longer than the relay release time, is started in response to a signal from an inverter 67. Both the thyristors 15, 15a are started during the time of operation of the mono-flop 68. If the relay 56 has been de-energized and the contact 51 has been opened, both the thyristors 15, 15a are switched off "gently" during the zero crossing of the load current without the possibility of an arc occurring at the relay contact. As the thyristors 15, 15a have to take over the load current very briefly, they can be designed correspondingly small. Cooling is not important due to the short operation period. The thyristors can be made very compact. The relay 52 can also be designed accordingly small because the thyristors protect the contact 51. In this embodiment, the exact switch-on moment can also be taken over by the thyristors 15, 15a so that tolerances in the relay starting time delay do not exert a negative influence.

Figures 10A, 10B, 10C:
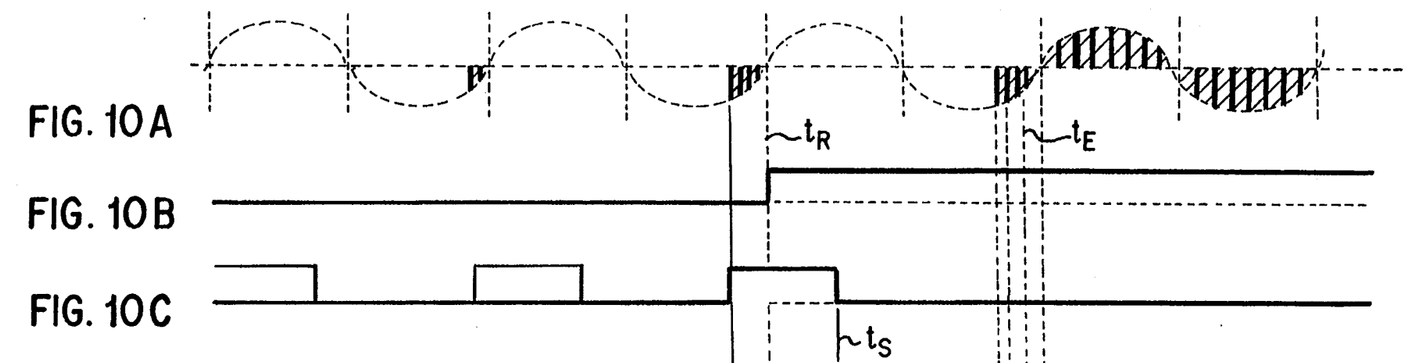
FIG. 10 shows several diagrams analogous to FIG. 7.
Figures 10D, 10E, 10F, 10G:
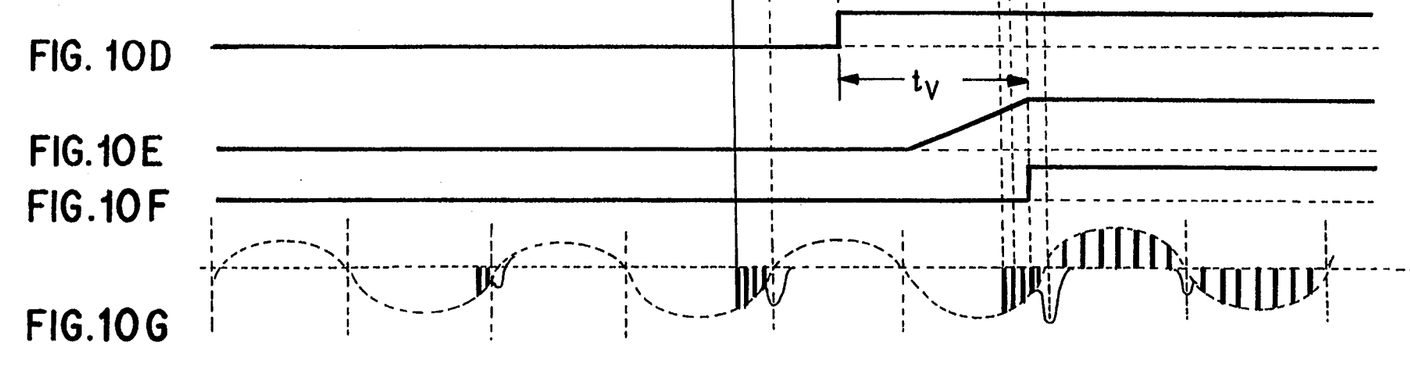
Figure 11:
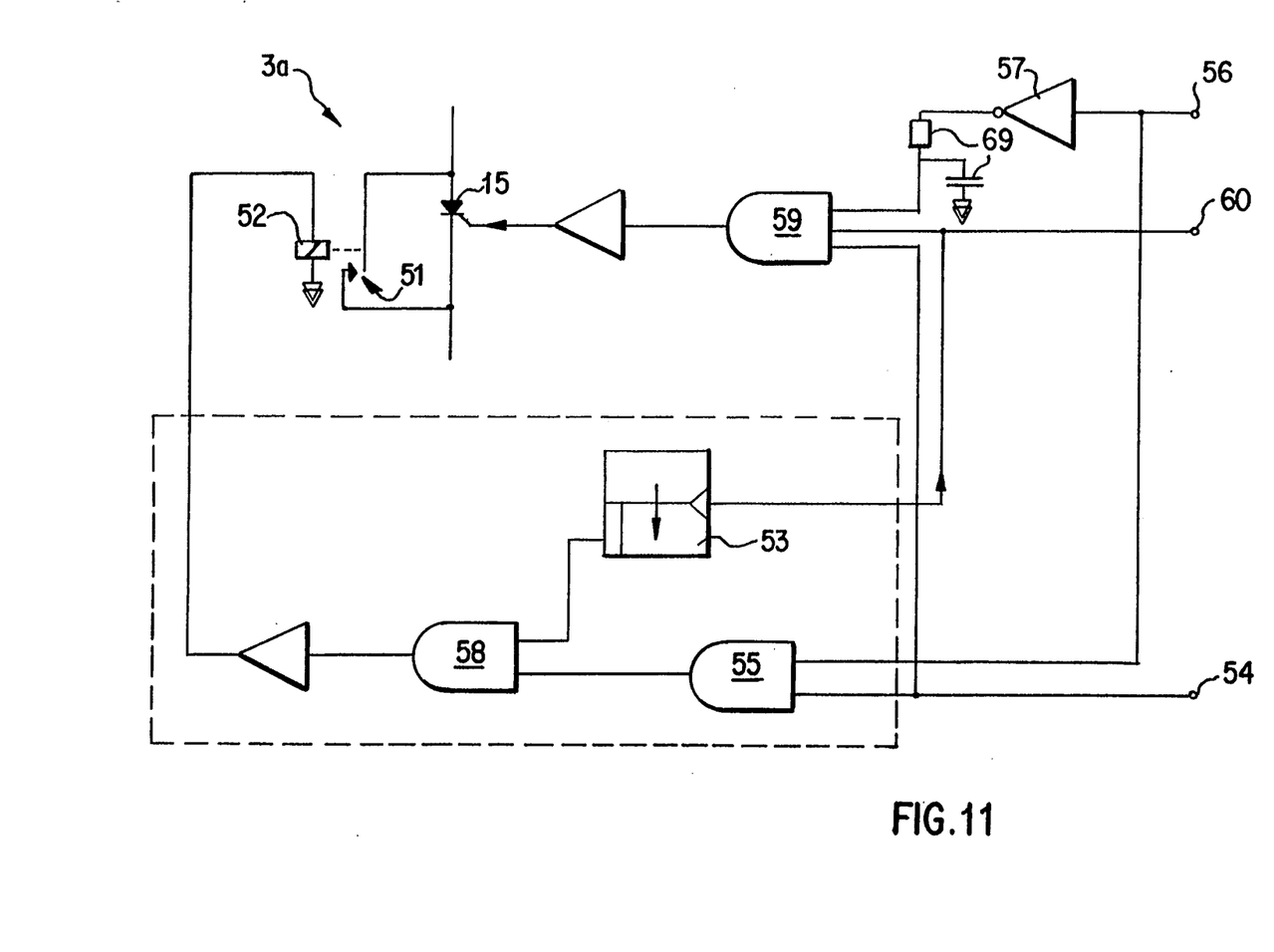
FIG. 11 shows a modified circuit analogous to FIG. 8.

A further improvement is shown in FIGS. 10 and 11 where the circuit is made even more reliable in operation when there are great fluctuations in the mains voltage. Generally, the relay would have a tendency to start too early in the event of overvoltage and too late in the event of undervoltage. These unsuitable switch-on moments would cause great reactive current peaks.

As can be seen in FIG. 7, according to line I of the diagram, increasingly larger phase limited voltage signals are switched to the load by the thyristor 15. When a reactive current threshold value occurs according to line III, a mono-flop is started, the time delay of which is tuned to the starting time of the relay. This time delay plus the relay starting time tv yields the amount of time from the switch-on moment tR to the relay contact closing moment tE.

In order to reduce the contact burndown at the relay and in order to switch in the relay contact within a "safe" time span even if there are fluctuations in the mains voltage, it is now proposed that the thyristor be started once more during the relay switch-in phase. The starting time covered by the thyristor should be as great as or greater than the tolerance of the relay contact. The switch-on time of the thyristor may be as great as the signal immediately prior to a particular period. However, the circuit prescribes increasingly larger voltage phases so this voltage phase prior to the actual switching-in is somewhat larger than the preceding voltage phase. The circuit of FIG. 11 shows the means for starting the thyristor 15 once more prior to switching-in the relay. When there is an ON-signal at 56 this signal is inverted by the RC element 69 and then delayed for the length of at least one period so that an AND-gate 59 is held open after one period following the last voltage phase switched from the thyristor 15. In this manner, a starting impulse can be provided to start the thyristor. The starting signals arrive at input 60.

In FIG. 10, it can be seen that according to line III, the mono-flop 53 does not only start, like in FIG. 7, when predetermined reactive current threshold has been exceeded, but rather, is triggered each time with the starting impulse for a voltage phase. As the voltage time area of the voltage phase according to line I is used for the reactive current impulse, when there are voltage fluctuations, the duration of the voltage phase can also change so that the reactive current threshold is exceeded. If mains voltages are high, the time is later for switching the voltage to the load 5. If the mains are low, the time is early for switching the mains to the load 5. The mono-flop 53 is started each time with the start signal 60 starting the thyristor (see FIG. 11) so that the time shifts accordingly. As the decreasing edge of the mono-flop starts the flow of current to the relay, if the reactive current threshold is exceeded, the time thus also shifts in accordance with the varying mains voltages. In this way, an automatic adaption of the mains voltage fluctuations is yielded for the relay to ensure that even in these varying cases of operation, the relay contacts are within the provided tolerance limits.

Although the mono-flop 53 switches every time with the starting impulse of the thyristor, its falling edge does not influence the current flow to the relay until the reactive current threshold has also been exceeded prior to the falling edge of the mono-flop. Although in FIG. 10 this time lies within the mono-flop impulse, this is not necessarily so. For example, relays can have a very long starting time so that the mono-flop impulse is correspondingly short. In that case the mono-flop would already have fallen before the reactive current threshold value occurred.

In various transformers, the reactive current impulse occurs at different moments with regard to mains voltage zero crossing. For example, in ring core transformers, the reactive current peaks occur prior to the zero crossing and in normal transformers approximately during the zero crossing. Previously, this has resulted in varying contact closing times. However, as the monoflop is only started with the beginning of the thyristor starting, the time of the actual occurrence of the reactive threshold value does not determine the moment of flowing current to the relay.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method for safeguarding an a.c. circuit having an electrical load associated therewith, comprising the steps of:
    applying for a duration of time a phase limited a.c. voltage signal to the load, wherein the duration of each subsequent voltage signal is greater than the duration of a previous voltage signal; and
    measuring active current flowing into the load during a time window starting at the application of the voltage signal and ending before a zero crossing of the voltage signal, wherein the phase limited voltage is no longer applied to the load in response to the active current exceeding a predetermined value.

2. A method for safeguarding an a.c. circuit having an electrical load associated therewith, according to claim 1, further comprising the steps of:
    measuring reactive current flowing into the load during a zero crossing of the phase limited a.c. voltage signal; and
    in response to the reactive current exceeding a predetermined value, generating and applying a voltage signal to the load having a greater value and opposite polarity than the phase limited a.c. voltage signal.

3. A method for safeguarding an a.c. circuit having an electrical load associated therewith, according to claim 1, wherein in response to said active current not exceeding a predetermined value during the time window, the a.c. circuit is connected to a main power supply.

4. A method for safeguarding an a.c. circuit having an electrical load associated therewith, according to claim 3, further comprising diminishing influence of fluctuations in the voltage signal supplied to the a.c. circuit via a switch in response to a point in time that the current flows into the switch being dependent upon a point in time that current flows into said load.

5. Apparatus for safeguarding an a.c. circuit having an electrical load associated therewith, comprising:
    an a.c. switch connected in series to the a.c. circuit;
    a phase trigger coupled to the a.c. switch, for providing a signal to actuate the a.c. switch to thereby apply a phase limited voltage to the load;
    a process control, for providing a signal to the phase trigger to increase a duration of the phase limited voltage for successive a.c. cycles;
    a current measurement unit, coupled in series between the a.c. circuit and the a.c. switch;
    a gating unit, coupled in series between the current measurement unit and the process control, for providing current of the circuit to the process control in response to an input signal;
    a time delay unit, for providing an input signal to the gating unit for a predetermined amount of time in response to a signal from the phase trigger; and
    an active current measurement unit, coupled in series between the output of the gating unit and an input of the process control, for providing a signal indicative of active current exceeding a predetermined limit.

6. Apparatus for safeguarding an a.c. circuit having an electrical load associated therewith, according to claim 5, wherein the active current measurement unit comprises:
    a comparator, having an input for an actual active current level and an input for a presettable current limit which can be changed from a first value used for load precheck to a second value used after a main voltage supply is coupled to the a.c. circuit.

7. Apparatus for safeguarding an a.c. circuit having an electrical load associated therewith, according to claim 6, wherein changing the current limit at the comparator is provided by an electronic switch connected to the process control and to a supplementary resistance for a voltage divider for varying the current provided to the comparator.

8. Apparatus for safeguarding an a.c. circuit having an electrical load associated therewith, according to claim 5, further comprising:
    a second gating unit, coupled in series between the current measurement unit and the process control, for providing current of the a.c. circuit to the process control in response to an input signal;
    a time delay unit coupled to the second gating unit, for providing the input signal to the second gating unit for a predetermined amount of time in response to a signal from the phase trigger indicating a zero crossing of the phase limited voltage; and
    a reactive current measurement unit, coupled in series between an output of the second gating unit and an input of the process control, for providing a signal indicative of reactive current exceeding a predetermined limit.

9. Apparatus for safeguarding an a.c. circuit having an electrical load associated therewith, according to claim 5, wherein the switch element comprises:
    a thyristor, for initially providing current to the load;
    a relay, connected in parallel to the thyristor, for providing current to the load when a main voltage is applied to the load; and
    a control unit, for actuating the thyristor and the relay.

10. Apparatus for safeguarding an a.c. circuit having an electrical load associated therewith according to claim 9, wherein a point in time of current flowing into the relay depends upon a point in time that current flows to the load after the load has reached a reactive current limit.

11. Apparatus for safeguarding an a.c. circuit having an electrical load associated therewith, according to claim 5, wherein the switch element comprises:
    a pair of thyristors, for initially providing either positive or negative current to the load; and
    a relay, connected in parallel to the thyristors, for providing current to the load when switched on.

* * * * *